(12) United States Patent
Spooner et al.

(10) Patent No.: US 10,930,011 B2
(45) Date of Patent: Feb. 23, 2021

(54) DIGITAL IMAGE PROCESSING SYSTEM FOR OBJECT LOCATION AND FACING

(71) Applicant: BILLUPS, INC., Lake Oswego, OR (US)

(72) Inventors: Shawn Spooner, Beaverton, OR (US); Sicong Chen, Tigard, OR (US)

(73) Assignee: BILLUPS, INC., Lake Oswego, OR (US)

( * ) Notice: Subject to any disclaimer, the term of this patent is extended or adjusted under 35 U.S.C. 154(b) by 0 days.

(21) Appl. No.: 16/460,610

(22) Filed: Jul. 2, 2019

(65) Prior Publication Data
US 2021/0004982 A1    Jan. 7, 2021

(51) Int. Cl.
| G06K 9/00 | (2006.01) |
| G06T 7/73 | (2017.01) |
| G06T 7/00 | (2017.01) |
| G06T 7/246 | (2017.01) |
| G06T 5/00 | (2006.01) |
| G06T 7/174 | (2017.01) |

(52) U.S. Cl.
CPC .............. *G06T 7/74* (2017.01); *G06T 5/002* (2013.01); *G06T 7/174* (2017.01); *G06T 7/248* (2017.01); *G06T 7/97* (2017.01)

(58) Field of Classification Search
CPC .. G06T 7/74; G06T 7/97; G06T 7/174; G06T 7/248; G06T 5/002
See application file for complete search history.

(56) References Cited

U.S. PATENT DOCUMENTS

| 6,516,090 | B1 | 2/2003 | Lennon |
| 8,121,350 | B2 | 2/2012 | Klefenz |
| 8,131,118 | B1 | 3/2012 | Jing |
| 10,191,635 | B1 | 1/2019 | Ogale |
| 2006/0279630 | A1 | 12/2006 | Aggarwal |
| 2007/0079331 | A1* | 4/2007 | Datta ............... H04N 21/47815 725/42 |
| 2017/0046580 | A1* | 2/2017 | Lu .............................. G06T 7/74 |

(Continued)

FOREIGN PATENT DOCUMENTS

| CN | 106840167 A | 6/2017 |
| CN | 106908043 A | 6/2017 |

(Continued)

OTHER PUBLICATIONS

Amir R. Zamir. "Using Location to See!" https://web.stanford.edu/class/cs231m/lectures/lecture-13-geo.pdf May 16, 2019. pp. 1-113.

(Continued)

*Primary Examiner* — Xin Jia
(74) *Attorney, Agent, or Firm* — Lempia Summerfield Katz LLC (57) ABSTRACT

Despite the impressive advances made in recent decades, past digital image processing system were faced with significant technical challenges to solving important technical problems. The digital image processing system described below helps to solve these technical challenges with regard to spatial location and orientation of arbitrary objects in real-world environments. The digital image processing system performs image segmentation to accurately identify objects in an image, then locates the objects and determines their orientations.

20 Claims, 5 Drawing Sheets

(56) References Cited

U.S. PATENT DOCUMENTS

2017/0287170 A1 10/2017 Perona
2018/0020247 A1* 1/2018 Zhang ................ G06Q 30/0241
2018/0300356 A1* 10/2018 Li ......................... G06F 16/444
2020/0160537 A1* 5/2020 Urtasun .................. G06T 7/246

FOREIGN PATENT DOCUMENTS

| CN | 107133325 A | 9/2017 |
| JP | 2004220292 A | 8/2004 |
| KR | 1020060131145 A | 12/2006 |
| WO | WO2016095176 A1 | 6/2016 |
| WO | 2019079895 A1 | 5/2019 |

OTHER PUBLICATIONS

Vo, Nam N., and James Hays. "Localizing and orienting street views using overhead imagery." Georgia Institute of Technology. Mar. 22, 2017. pp. 1-24.
International Search Report and the Written Opinion for International Patent Application PCT/US2020/039310 dated Sep. 29, 2020.

* cited by examiner

DIGITAL IMAGE PROCESSING SYSTEM FOR OBJECT LOCATION AND FACING

TECHNICAL FIELD

This disclosure relates to image processing. More particularly, this disclosure relates to processing image data to identify objects within the images as well as the location and facing of those objects.

BACKGROUND

Digital image processing has a tremendous range of application and for some important problems is the only practical approach at a solution. Despite the advances made in the last several decades with image processing, significant technical challenges remain in many subject matter areas and for many applications. Improvements in digital image processing systems will help solve these technical challenges, e.g., with regard to identification, spatial location, and orientation of arbitrary objects captured in images of real-world environments.

DETAILED DESCRIPTION

Important technical problems pose a challenge to digital image processing systems. As one example, the technical problems include accurately identifying discrete objects in a scene which may be very simple or very complex, while at the same time being subject to a wide range of image quality considerations, such as obscuring shadows. Additional technical problems include determining the spatial location of the objects, e.g., their latitude and longitude, as well as their orientation, e.g., angles of rotation. The digital image processing system described below solves these and other technical problems.

Figure 1:
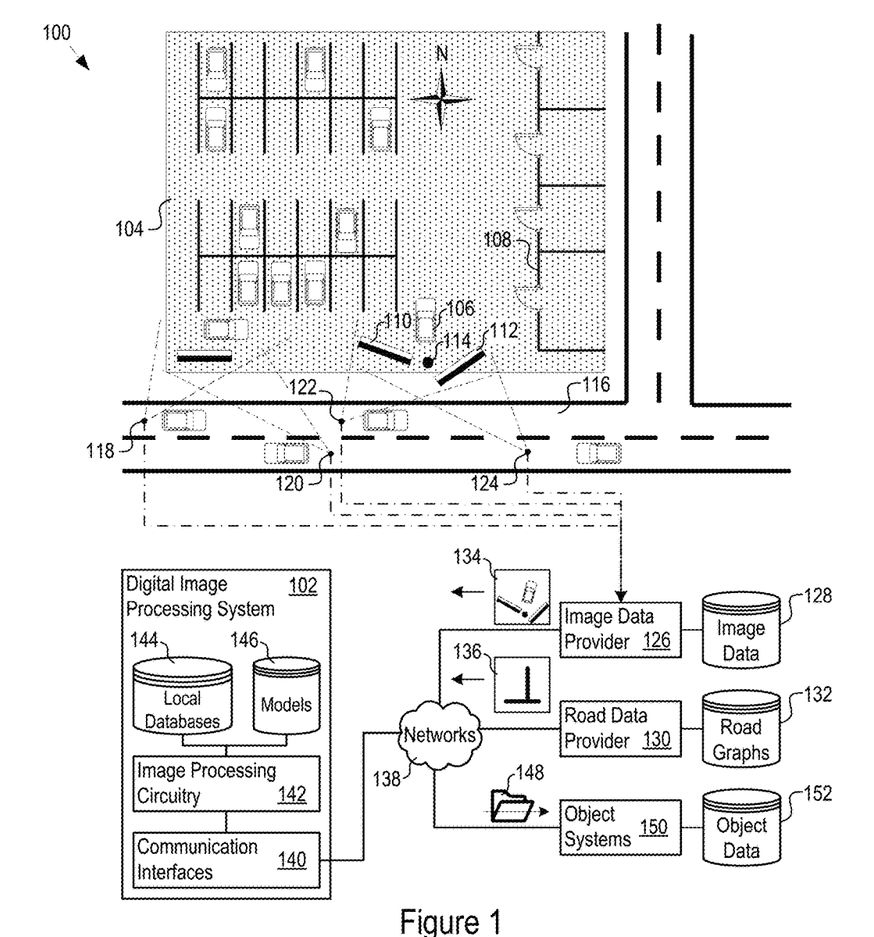
FIG. 1 shows an image processing system operating to determine spatial location and orientation of objects in an arbitrary environment.

FIG. 1 shows an arbitrary environment 100 and a digital image processing system 102 ("system 102") operating to determine spatial location and orientation of objects in the environment 100. This example is used for discussion purposes below; the system 102 may analyze any environment including any objects. In this example, the environment 100 includes a parking lot 104 and objects including cars 106, stores 108, billboards 110 and 112, and utility poles 114. A road 116 runs near the parking lot 104.

Images of the parking have been taken along the road from specific viewpoints. In FIG. 1, four viewpoints 118, 120, 122, and 124 are shown that capture certain portions of the parking lot 104 and certain objects within the parking lot 104. The viewpoints 118-124 are located along the road 116 (and may be considered streetview viewpoints of the parking lot), but the viewpoints may be at vantage point whether on or along the street or elsewhere.

An image data provider 126 receives the image data captured at the viewpoints 118-124. The image data may be tagged with geolocation, timestamp, and other metadata. The image data provider 126 builds and maintains the image data database 128, e.g., by updating or adding the image data from the viewpoints 118-124 to existing image data in the image data database 128.

Similarly, a road data provider 130 builds and maintains a road graph database 132. The road graph database 132 stores graph representations of road networks in any given geographical regions for which the road data provider 130 supplies data. In this example, the road data provider 130 maintains a road graph 136 of the road network in the environment 100.

The system 102 communicates over the networks 138 with the image data provider 126, e.g., to receive image data 134, and with the road data provider 130, e.g., to receive road graphs such as the road graph 136. The system 102 includes communication interfaces 140, image processing circuitry 142, local databases 144, and models 146. The local databases 144 may store image data, road graphs, and object data, for instance. The models 146 may include, as examples, scene segmentation models that predict object labels, linear smoothing models to smooth mask boundaries, object identification models that identify obstructing foreground objects, object splitting models that separate overlapping objects, and mask accuracy classifiers to validate mask accuracy.

The system 102 applies the models 146 to determine the spatial location of selected objects and their orientations in the environment 100. The system 102 may then transmit object reports 148 conveying the spatial locations and orientations to any desired external object systems 150. The object systems 150 may represent, for instance, systems or organizations responsible for the placement, monitoring, or management of any of the objects in the environment 100. Accordingly, the object system 150 may verify the proper placement and orientation of the objects for which they are responsible, or may initiate corrective actions based on the object reports 148, e.g., actions to correct an incorrect placement or orientation. In addition, the object systems 150 may provide object data 152 to the system 102 as described in more detail below.

Figure 2:
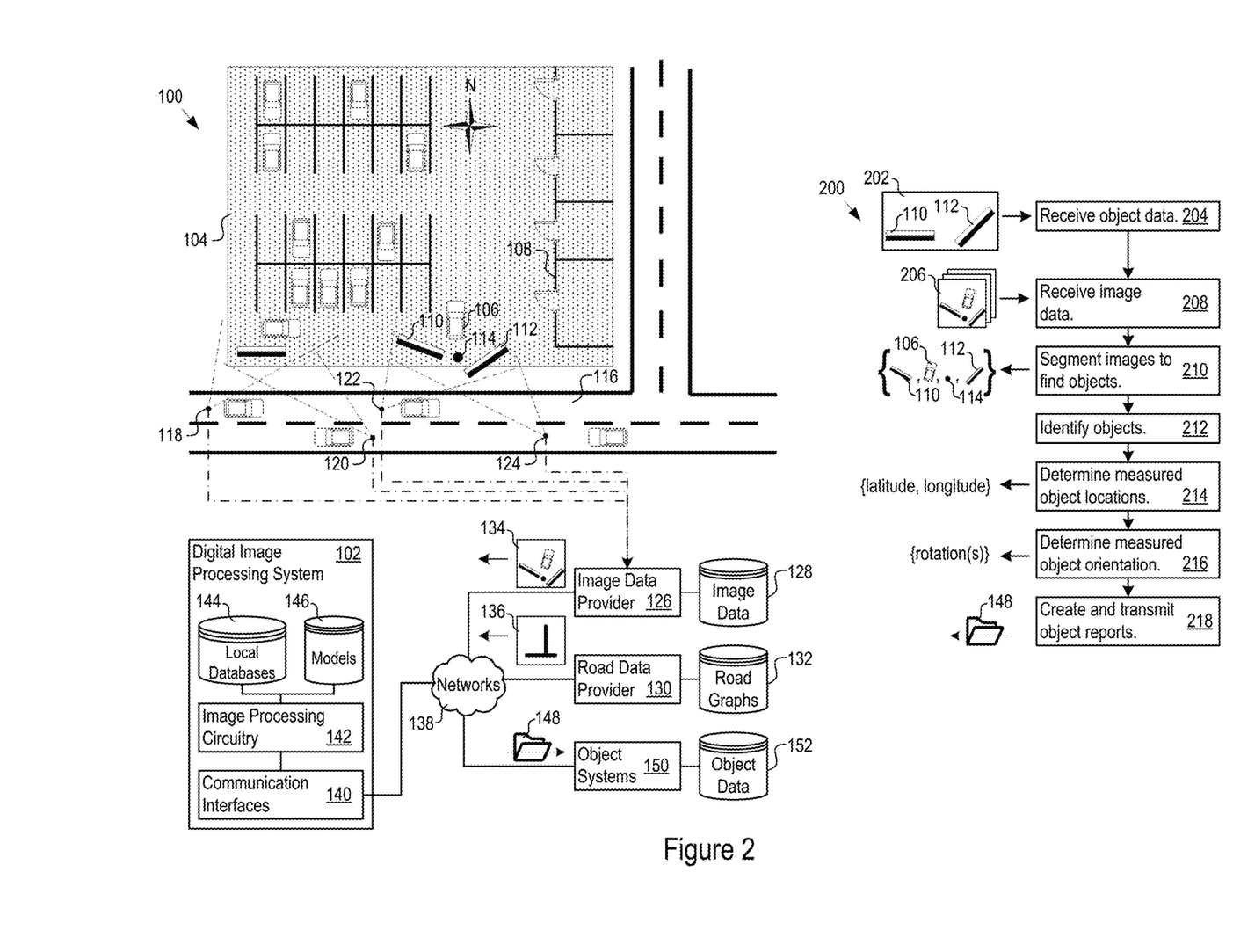
FIG. 2 shows an example of the logic that the system may execute.

FIG. 2 shows an example of the logic 200 that the system 102 may execute. The system 102 receives object data 202, e.g., from the object systems 150 (204). The object data 202 specifies expected properties of specific objects in the environment 100. For instance, the object data 202 may specify the correct or expected object orientation (e.g., angle(s) of rotation); expected object location (e.g., latitude and longitude); expected object elevation; object width, depth, and height; or other object properties for any object in the environment 100. In the example in FIG. 2, the system 102 receives object data for the billboard 110 that specifies an expected location for the billboard 110 and an expected orientation for the billboard 110 in terms of rotation around a vertical axis.

The system 102 also receives image data 206 from multiple distinct viewpoints in the environment 100 (208). The image data 206 captures images of the environment 100 in which the object under analysis is expected to exist. Among other characteristics, the image data 206 may be characterized by longitude, latitude, heading, and field of view (which indicates focal length) looking at those objects that the system 102 will analyze. Expressed another way, the system 102 receives image data capturing images of one or more of the objects in the environment 100 for which the system 102 received the object data 202. The image data provider 126 may transmit the image data to the system 102 at the request of the system 102, for instance. Alternatively, the system 102 may obtain the image data from its own local database 144, or from another image source.

The system 102 segments the images to find individual objects within the images (210). With regard to the example of FIG. 1, the system 102 may determine that (at least) four distinct objects exist in the images obtained from viewpoint 122 and viewpoint 124. Having determined that there are four objects, the system 102 may then identify those objects (212). In this example, the system 102 determines that the four objects are (or are likely to be) the billboard 110, billboard 112, utility pole 114, and car 106.

For any of the objects, the system 102 may determine a measured object location from the image data, e.g., the latitude and longitude of the object (214). In addition, the system 102 may determine measured object orientation(s) from the image data, e.g., one or more angles of rotation around predefined axes of that object at its location (216). The system 102 inserts the measured object location and measured object orientation data into object reports 148 and transmits the object reports 148 to the object systems 150 responsible for the objects (218).

Figure 3:
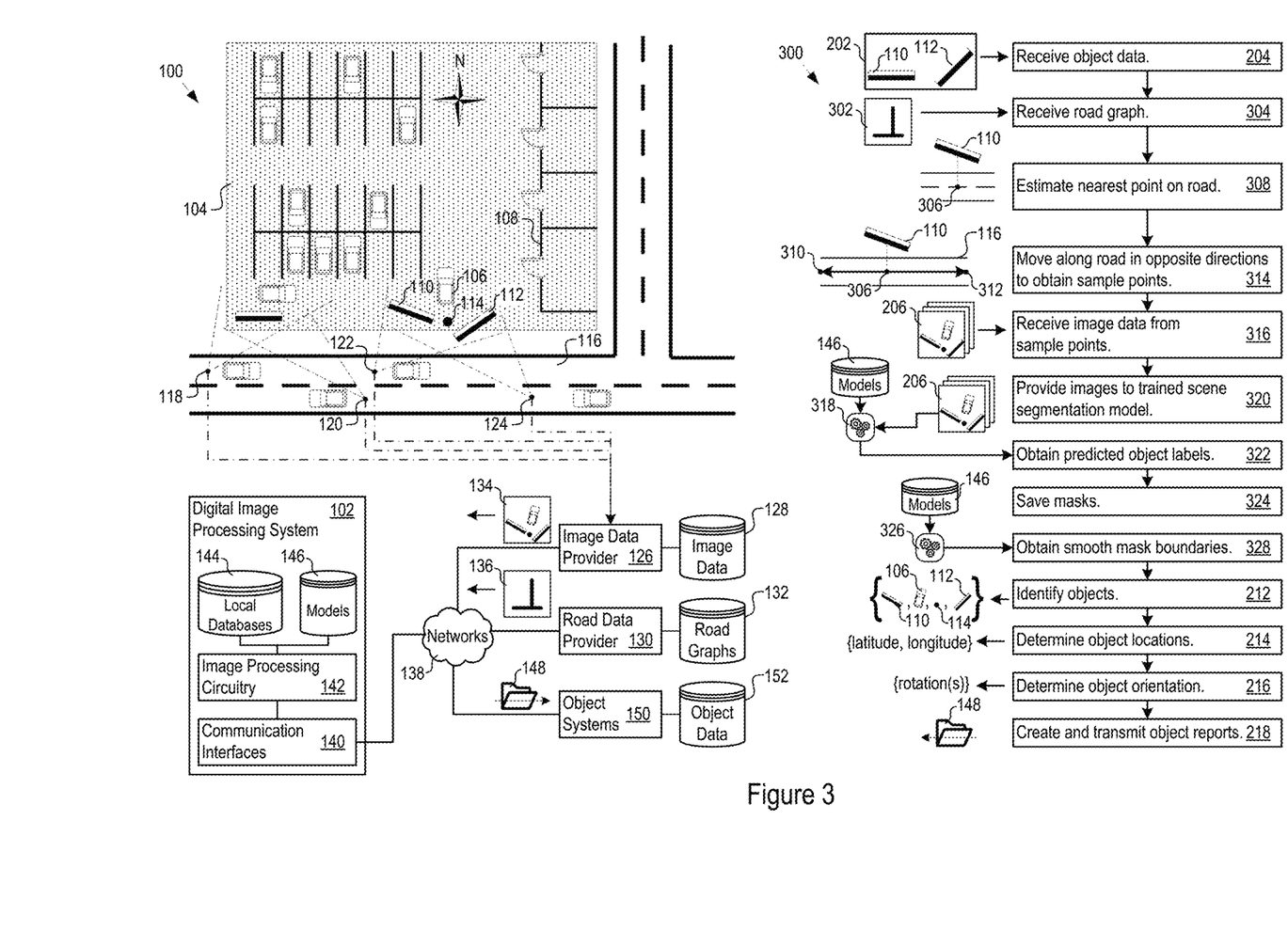
FIG. 3 shows an additional example of logic that the system may execute.

The analyses performed by the system 102 are described in more detail below in FIGS. 3 and 4. FIG. 3 shows an example of logic 300 that the system 102 may execute, including determining sample points for image data and segmenting images. In FIG. 3, the system 102 has received the object data (204) which includes the expected object location, orientation, and other properties. The system 102 requests and receives a road graph 302 for the environment 100 in which the object exists (304), e.g., from the road data provider 130. Alternatively, the system 102 may obtain the road graph from its own local database 144, or from other sources. Given the expected location of the object specified in the object data 202, the system 102 determines a reference point 306 from which the system 102 will determine view sample points. For instance, the system 102 may choose the point on the nearest road that minimizes distance to the object (308) as the reference point 306.

From the reference point 306, the system 102 moves along the road in opposite directions for a predetermined distance, e.g., 30 meters, a predetermined number of times, e.g., one 30 meter offset in each direction. These offsets give multiple sample points 310 and 312 (e.g., specified by latitude and longitude) from which to obtain image data of the environment 100. Based on the sample points, the system 102 requests and receives image data from the image data provider 126. That is, the system 102 requests images with a camera heading oriented toward the subject (316) at the sample points 310 and 312 or within a system configurable radius of the sample points 310 and 312. For the example environment 100, the sample points 310 and 312 may result in image data received from the viewpoints 122 and 124 for the billboard object 110, for instance.

As noted above with regard to FIG. 2, given the image data the system 102 segments the images to find objects (210). In more detail, the system 102 provides the images as input to a trained scene segmentation model 318 (320). In one implementation, the scene segmentation model 318 predicts object labels for each pixel in the images (322). The labels form masks that the system 102 may save as single color channel images (e.g., portable network graphic (PNG) images) (324). In these images, the pixel intensity may match to any predetermined image class predefined or preconfigured within the system 102.

The system 102 also applies a linear model 326 to obtain masks with smoothed boundaries (328). In one implementation, the linear model 326 detects linear boundaries from mask outlines and detects the front or face of an object based on color contrast. The scene segmentation model 318 and linear model 326 help to significantly eliminate shadows and other image artifacts in the images. For example, the models will eliminate shadows cast by poles, catwalks, and other supporting structure, as well as eliminate shadows cast by a second object that is back-to-back with a first object.

In one implementation, the scene segmentation model 318 is a deep neural network such as a wide residual neural network. This network may be trained, e.g., on 10,000 or more street scenery images with 200 or more object classes. The predetermined image classes include, as examples, different types of ground surfaces such as roads and sidewalks; naturally occurring objects such as the sky, plants, grass, and water; man-made objects such as poles, buildings, benches, street signs, business signs, and billboards; types of road lane markings; vehicles such as cards, busses, bicyclists, and motorcycles; living creatures such as humans, birds, dogs, and cats; and other classes.

In one implementation, the system 102 assumes that object boundaries are linear or are combinations of linear boundaries. The linear model 326 may then use the linear (and narrow) distribution of boundary pixels and sharp color contrast to filter out fluctuating pixel noise and error coming from the masks output by the scene segmentation model 318. With the knowledge of possible geometric shapes from the 3D object as projected into 2D imagery (e.g., a trapezoid), the system 102 further filters out the shadows.

Figure 4:
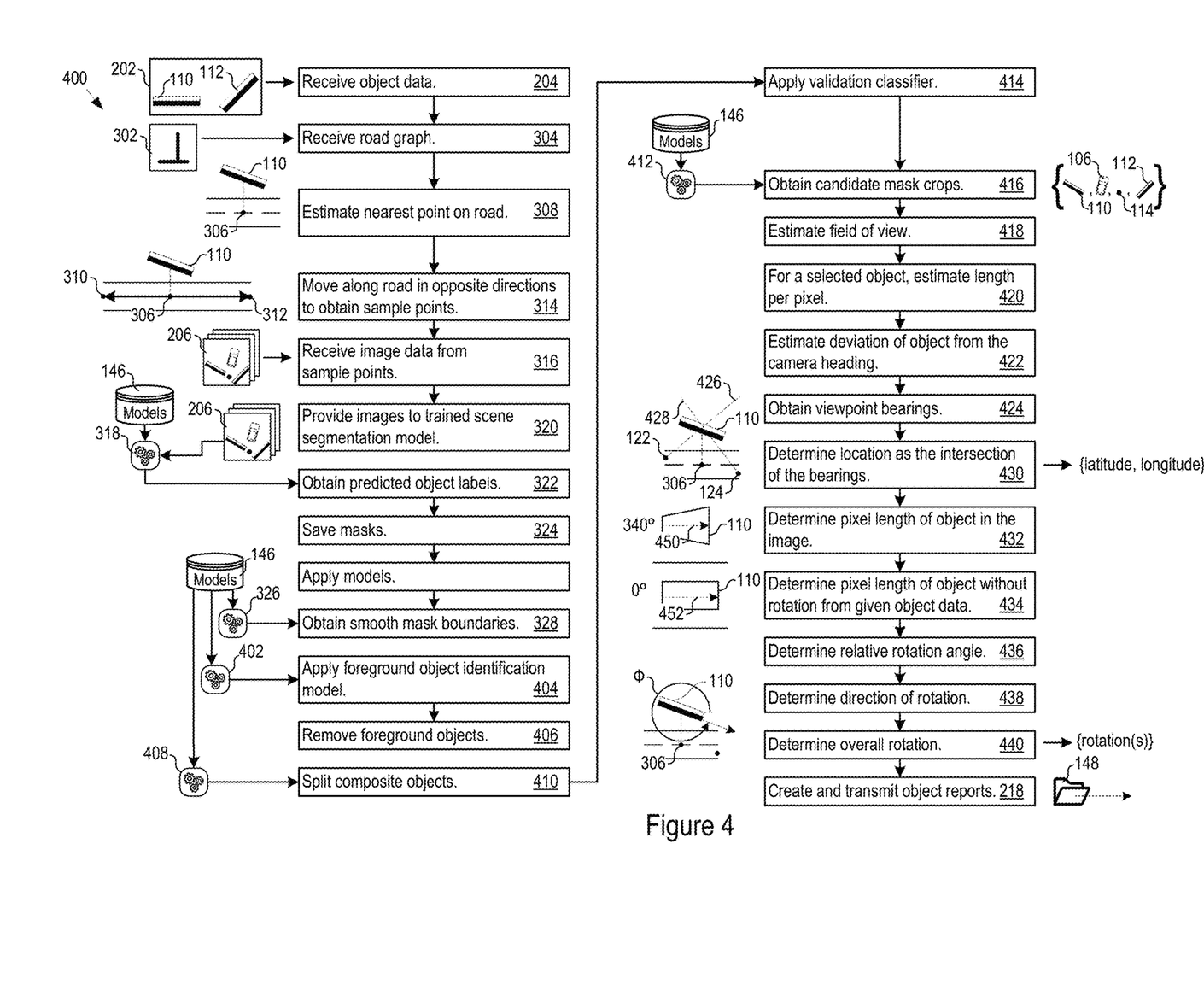
FIG. 4 shows another example of logic that the system may execute.

Building on the prior examples in FIGS. 2 and 3, FIG. 4 shows an example of logic 400 that the system 102 may execute, including identifying objects and determining object location and orientation. The system 102 applies a foreground object identification model 402 to the masks (404). The foreground object identification model 402 identifies objects that are in the foreground, and the system 102 removes the foreground objects from the masks (406). The system 102 also applies a shared structure model 408. The shared structure model 408 splits composite objects into separate objects (410). Examples of composite objects include objects sharing a structure or overlapping in two dimensions.

Next, the system 102 provides each proposed localized object to a validation classifier 412 which validates the accuracy of the masks (414). The validation classifier 412 generates a series of candidate mask crops for each mask (416), e.g., those output from (328) explained above. In one implementation, the validation classifier 412 is a deep neural network, e.g. a deep residual convolutional network trained over many types of object labels, e.g., 15,000 or more object labels. The mask crops capture identified objects that have been segmented out of the image data 206. That is, the single channel color mask contains the cropped out pixels of the identified object from the original image.

In one implementation, the validation classifier 412 is a deep neural network such as a residual convolutional neural network. The validation classifier 412 may be trained on 10,000 or more images to classify whether that class of object exists in an image. The shared structure model 408 takes the mask crops output from the scene segmentation model 318 and transforms the cropped imagery to a single channel gray scale image. Based on pixel luminance contrast, the shared structure model 408 may separate two or more objects on the same structure into a separate mask for each object. The foreground object identification model 402 determines the probability of an object being in the foreground of another object. In one implementation, the foreground object identification model 402 performs its analysis using the pixel 2D continuity of PNG results from the scene segmentation model 318.

The system 102 estimates the focal length of the camera based on the field of view of the images (418). In some implementations and for some objects, the system 102 may assume that the left side edge and right side edge of the object should stand vertically on the ground, and that the surface of the road is parallel to the ground under the object. Further, the system 102 may also assume that there should be negligible rotations of the object side edges in the vertical direction. Under these assumptions, the system 102 may estimate the length per-pixel at the location of the object (420) given the physical height of the object from the object data 202, e.g., by counting the number of pixels along the height of the object.

In addition, the system 102 may estimate the deviation of the object from the camera heading (422) toward the object. In that respect, note that the system 102 will have an estimate of the distance from the known sample points to the object location. The system 102 may therefore count the pixel distance from the center of the object to the center of the image and converts the distance into a physical length in order to estimate the deviation of the object from the camera heading.

With regard to the location of the object, the system 102 may determine bearings to the object from each sample point (424). Continuing the example above, the system 102 may, for instance, determine a bearing 426 to the billboard 110 for viewpoint 122 and a bearing 428 to the billboard 110 for viewpoint 124. The system 102 determines the intersection of the bearings from the different viewpoints as the location of the object, e.g., in latitude and longitude (430).

With regard to object orientation, the system 102 estimates the angular rotation of the object around any chosen axis, e.g., a yaw angle $\phi$ around a vertical axis. The system 102 may perform the estimation by determining object width, e.g., as the rotated pixel length 450 from the left side edge of the object to the right side edge of the object in the image (432), and determining the unrotated pixel length 452 (or object width) if the object were facing without rotation toward the camera (434). The difference in pixel length is a function of the angle of rotation and known object shape, from which the system 102 determines the relative angle of rotation (436).

The system 102 also determines the direction of rotation with respect to the camera heading (438). In one implementation, the system 102 makes this determination based on which edge of the object is higher than the other, e.g., if the left edge is higher than the right edge then the rotation is counterclockwise. Adding or subtracting (depending on direction of rotation) the determined direction of rotation to or from the camera heading gives the overall angular rotation $\phi$ of the object along the chosen axis (440).

Figure 5:
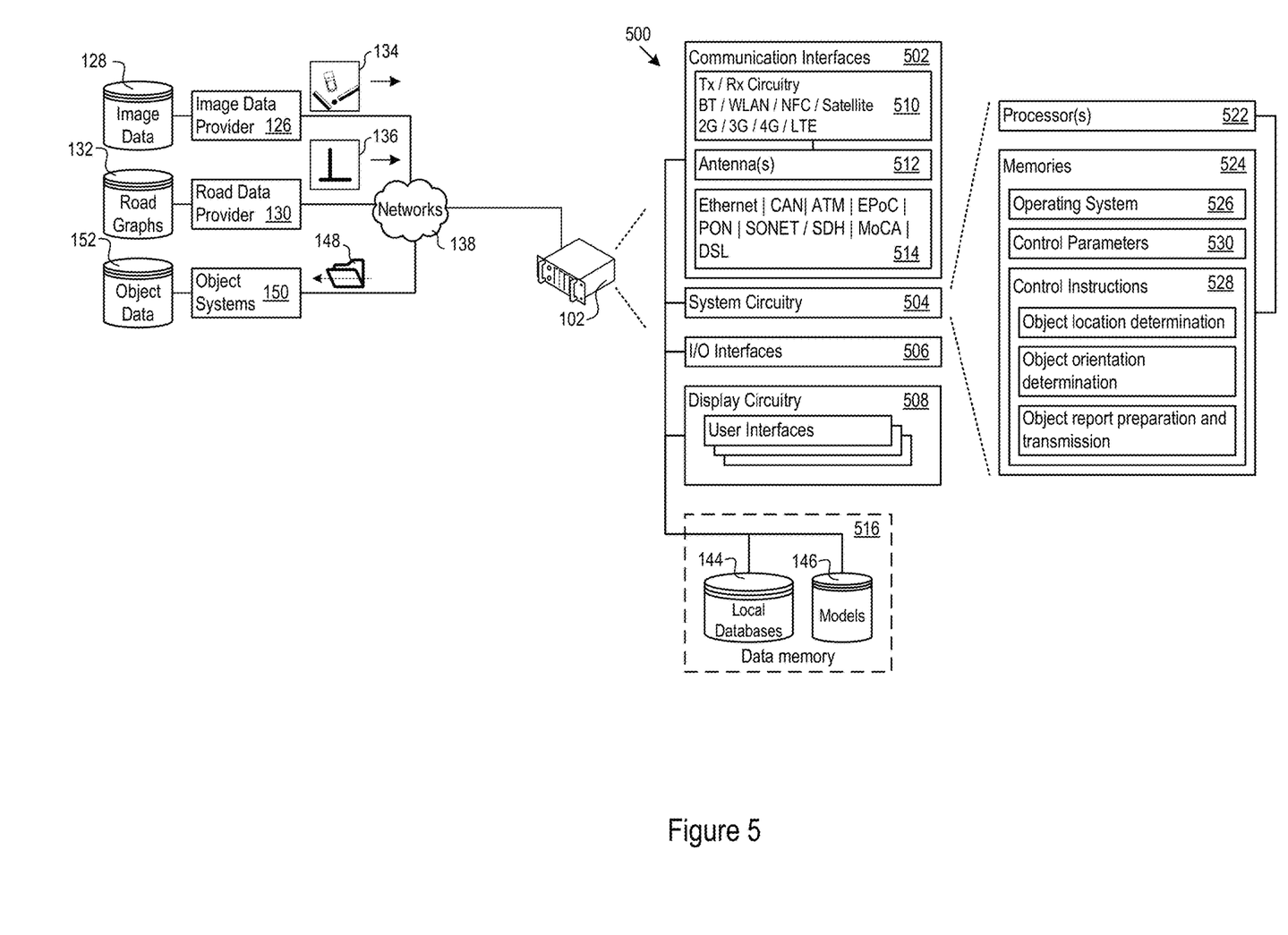
FIG. 5 shows an example implementation of the image processing system.

FIG. 5 shows an example implementation 500 of the system 102. The implementation 500 includes communication interfaces 502, system circuitry 504, input/output (I/O) interfaces 506, and display circuitry 508. The system circuitry 504 may include any combination of hardware, software, firmware, or other circuitry. The system circuitry 504 may be implemented, for example, with one or more systems on a chip (SoC), application specific integrated circuits (ASIC), microprocessors, microcontrollers, discrete analog and digital circuits, and other circuitry. The system circuitry 504 is part of the implementation of any desired functionality in the system 102. Accordingly, the system circuitry 504 may implement the logic 200, 300, and 400 described above with regard to FIGS. 2-4, as examples. The system 102 may store and retrieve data from data memories 516. For instance, the data memories 516 may store the local databases 144 and the models 146.

The display circuitry 508 and the I/O interfaces 506 may include a graphical user interface, touch sensitive display, voice or facial recognition inputs, buttons, switches, speakers and other user interface elements. Additional examples of the I/O interfaces 506 include Industrial Ethernet, Controller Area Network (CAN) bus interfaces, Universal Serial Bus (USB), Serial Advanced Technology Attachment (SATA), and Peripheral Component Interconnect express (PCIe) interfaces and connectors, memory card slots, and other types of inputs. The I/O interfaces 506 may further include Universal Serial Bus (USB) interfaces, audio outputs, magnetic or optical media interfaces (e.g., a CDROM or DVD drive), network (e.g., Ethernet or cable (e.g., DOCSIS) interfaces), or other types of serial, parallel, or network data interfaces.

The communication interfaces 502 may include transceivers for wired or wireless communication. The transceivers may include modulation/demodulation circuitry, digital to analog converters (DACs), shaping tables, analog to digital converters (ADCs), filters, waveform shapers, filters, preamplifiers, power amplifiers and/or other circuitry for transmitting and receiving through a physical (e.g., wireline) medium such as coaxial cable, Ethernet cable, or a telephone line, or through one or more antennas. Accordingly, Radio Frequency (RF) transmit (Tx) and receive (Rx) circuitry 510 handles transmission and reception of signals through one or more antennas 512, e.g., to support Bluetooth (BT), Wireless LAN (WLAN), Near Field Communications (NFC), and 2G, 3G, and 4G/Long Term Evolution (LTE) communications.

Similarly, the non-wireless transceivers 514 may include electrical and optical networking transceivers. Examples of electrical networking transceivers include Profinet, Ethercat, OPC-UA, TSN, HART, and WirelessHART transceivers, although the transceivers may take other forms, such as coaxial cable network transceivers, e.g., a DOCSIS compliant transceiver, Ethernet, and Asynchronous Transfer Mode (ATM) transceivers. Examples of optical networking transceivers include Synchronous Optical Networking (SONET) and Synchronous Digital Hierarchy (SDH) transceivers, Passive Optical Network (PON) and Ethernet Passive Optical Network (EPON) transceivers, and EPON Protocol over Coax (EPoC) transceivers.

Note that the system circuitry 504 may include one or more controllers 522, e.g., microprocessors, microcontrollers, FGPAs, GPUs, and memories 524. The memories 524 store, for example, an operating system 526 and control instructions 528 that the controller 522 executes to carry out desired functionality for the system 102. Accordingly, the control instructions 528 may implement the logic 200, 300, and 400 described above and with regard to FIGS. 2-4 for object location determination, object orientation determination, and object report preparation and transmission. The control parameters 530 provide and specify configuration and operating options for the control instructions 528.

The methods, devices, processing, circuitry, and logic described above may be implemented in many different ways and in many different combinations of hardware and software. For example, all or parts of the implementations may be circuitry that includes an instruction processor, such as a Central Processing Unit (CPU), microcontroller, or a microprocessor; or as an Application Specific Integrated Circuit (ASIC), Programmable Logic Device (PLD), or Field Programmable Gate Array (FPGA); or as circuitry that includes discrete logic or other circuit components, including analog circuit components, digital circuit components or both; or any combination thereof. The circuitry may include discrete interconnected hardware components or may be combined on a single integrated circuit die, distributed among multiple integrated circuit dies, or implemented in a Multiple Chip Module (MCM) of multiple integrated circuit dies in a common package, as examples.

Accordingly, the circuitry may store or access instructions for execution, or may implement its functionality in hardware alone. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

The implementations may be distributed. For instance, the circuitry may include multiple distinct system components, such as multiple processors and memories, and may span multiple distributed processing systems. Parameters, databases, and other data structures may be separately stored and managed, may be incorporated into a single memory or database, may be logically and physically organized in many different ways, and may be implemented in many different ways. Example implementations include linked lists, program variables, hash tables, arrays, records (e.g., database records), objects, and implicit storage mechanisms. Instructions may form parts (e.g., subroutines or other code sections) of a single program, may form multiple separate programs, may be distributed across multiple memories and processors, and may be implemented in many different ways. Example implementations include stand-alone programs, and as part of a library, such as a shared library like a Dynamic Link Library (DLL). The library, for example, may contain shared data and one or more shared programs that include instructions that perform any of the processing described above or illustrated in the drawings, when executed by the circuitry.

Various implementations have been specifically described. However, many other implementations are also possible.

What is claimed is:

1. A digital image processing system comprising:
   a communication interface configured to communicate with an external object system; and
   image processing circuitry coupled to the communication interface and configured to:
      obtain object data through the communication interface from the external object system, the object data comprising an expected object location and expected object orientation for a specific object in an environment;
      obtain image data from multiple distinct viewpoints of the specific object in the environment;
      segment the image data to identify the specific object in the image data;
      from the image data, determine a measured object location for the specific object in the environment; and
      from the image data, determine a measured object orientation for the specific object in the environment.

2. The system of claim 1, where:
   the image processing circuitry is further configured to:
      determine a reference point for the specific object in the environment; and
      determine sample points offset from the reference point; and
   where the image data from multiple distinct viewpoints comprises: image data taken within a predetermined radius of the sample points from a camera heading toward the specific object.

3. The system of claim 2, where:
   the image processing circuitry is further configured to:
      request and receive a road graph for the environment; and where:
   the reference point is on a road represented in the road graph.

4. The system of claim 3, where:
   the reference point is on a road represented in the road graph that minimizes distance to the specific object.

5. The system of claim 1, where:
   the image processing circuitry is further configured to:
      provide the image data to a trained scene segmentation model; and
      obtain image masks comprising predicted object labels from the trained scene segmentation model.

6. The system of claim 1, where:
   the image processing circuitry is further configured to:
      reduce image artifacts by applying a linear model to the image masks to obtain smooth mask boundaries.

7. The system of claim 1, where:
   the image processing circuitry is further configured to:
      apply a foreground object identification model to the image masks to determine a foreground object; and
      remove the foreground object from the masks.

8. The system of claim 1, where:
   the image processing circuitry is further configured to:
      determine a bearing to the specific object from each sample point; and
      determine an intersection of the bearings as the measured object location for the specific object in the environment.

9. The system of claim 1, where:
   the image processing circuitry is further configured to:
      determine an angle of rotation and a direction of rotation from object edge height and object width as captured in the image data of the specific object; and
      determine the measured object orientation as a function of the direction of rotation, angle of rotation, and a camera heading associated with the image data.

10. An image processing method comprising:
    providing a communication interface configured to communicate with an external object system; and
    with image processing circuitry:
       obtaining object data through the communication interface from the external object system, the object data comprising an expected object location and expected object orientation for a specific object in an environment;
       obtaining image data from multiple distinct viewpoints of the specific object in the environment;
       segmenting the image data to identify the specific object in the image data;

from the image data, determining a measured object location for the specific object in the environment; and from the image data, determining a measured object orientation for the specific object in the environment.

11. The method of claim 10, further comprising:
determining a reference point for the specific object in the environment; and
determining sample points offset from the reference point; and
where the image data from multiple distinct viewpoints comprises: image data taken within a predetermined radius of the sample points from a camera heading toward the specific object.

12. The method of claim 11, further comprising:
requesting and receiving a road graph for the environment; and where:
the reference point is on a road represented in the road graph.

13. The method of claim 12, where:
the reference point is on a road represented in the road graph that minimizes distance to the specific object.

14. The method of claim 10, further comprising:
providing the image data to a trained scene segmentation model; and
obtaining image masks comprising predicted object labels from the trained scene segmentation model.

15. The method of claim 10, further comprising:
reducing image artifacts by applying a linear model to the image masks to obtain smooth mask boundaries.

16. The method of claim 10, further comprising:
applying a foreground object identification model to the image masks to determine a foreground object; and
removing the foreground object from the masks.

17. The method of claim 10, further comprising:
determining a bearing to the specific object from each sample point; and
determining an intersection of the bearings as the measured object location for the specific object in the environment.

18. The method of claim 10, further comprising:
determining an angle of rotation and a direction of rotation from object edge height and object width as captured in the image data of the specific object; and
determining the measured object orientation as a function of the direction of rotation, angle of rotation, and a camera heading associated with the image data.

19. A digital image processing system comprising:
a communication interface operable to communicate with:
  an external object system;
  an external road data provider; and
  an external image data provider; and
image processing circuitry coupled to the communication interface, the image processing circuitry configured to:
  obtain object data through the communication interface from the external object system, the object data comprising an expected object location and expected object orientation for a specific object in an environment;
  obtain a road graph for the environment through the communication interface from the external road data provider;
  determine a reference point for the specific object in the environment, where the reference point is on a road represented in the road graph; and
  determine sample points offset from the reference point; and
  obtain image data, through the communication interface from the external image data provider, from multiple distinct viewpoints of the specific object within a predetermined radius of the sample points;
  from the image data, determine a measured object location for the specific object in the environment, the measured object location comprising an intersection of bearings to the specific object from the sample points; and
  from the image data, determine a measured object orientation for the specific object in the environment by determining an angle of rotation and a direction of rotation, with respect to a specific camera heading, from object edge height and object width as captured in the image data of the specific object.

20. The system of claim 19, where:
the image processing circuitry is further configured to:
  provide the image data to a trained scene segmentation model;
  obtain image masks comprising predicted object labels from the trained scene segmentation model;
  reduce image artifacts by applying a linear model to the image masks to obtain smooth mask boundaries;
  apply a foreground object identification model to the image masks to determine a foreground object; and
  remove the foreground object from the masks.

* * * * *